(12) United States Patent
Imamura

(10) Patent No.: US 9,475,347 B2
(45) Date of Patent: Oct. 25, 2016

(54) PNEUMATIC TIRE

(71) Applicant: SUMITOMO RUBBER INDUSTRIES, LTD., Kobe-shi, Hyogo (JP)

(72) Inventor: Ao Imamura, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 317 days.

(21) Appl. No.: 14/349,095

(22) PCT Filed: Oct. 1, 2012

(86) PCT No.: PCT/JP2012/075398
§ 371 (c)(1),
(2) Date: Apr. 2, 2014

(87) PCT Pub. No.: WO2013/054684
PCT Pub. Date: Apr. 18, 2013

(65) Prior Publication Data
US 2014/0238572 A1    Aug. 28, 2014

(30) Foreign Application Priority Data
Oct. 12, 2011    (JP) .................... 2011-224435

(51) Int. Cl.
*B60C 13/00*    (2006.01)
*B60C 13/02*    (2006.01)
(Continued)

(52) U.S. Cl.
CPC ........... *B60C 13/02* (2013.01); *B60C 17/0009* (2013.04); *B60C 15/024* (2013.01)

(58) Field of Classification Search
CPC ...... B60C 13/00; B60C 13/02; B60C 13/023
See application file for complete search history.

(56) References Cited

U.S. PATENT DOCUMENTS

| 2011/0030862 A1 | 2/2011 | Hayashi et al. |
| 2012/0060994 A1 | 3/2012 | Hayashi et al. |

FOREIGN PATENT DOCUMENTS

| JP | 8-258518 A | 10/1996 |
| JP | 2000-79809 A | 3/2000 |

(Continued)

OTHER PUBLICATIONS

International Search Report for PCT/JP2012/075398 mailed on Dec. 25, 2012.

(Continued)

*Primary Examiner* — Justin Fischer
(74) *Attorney, Agent, or Firm* — Birch, Stewart, Kolasch & Birch, LLP

(57) ABSTRACT

[Object] To provide a pneumatic tire which is excellent in durability.
[Solution] A tire has a large number of dimples 62 on sidewalls thereof. The contour of each dimple 62 is composed of a first circular arc 66, a second circular arc 68, a first connection line 70, and a second connection line 72. The curvature radius R2 of the second circular arc 68 is larger than the curvature radius R1 of the first circular arc 66. The first connection line 70 is a straight line. The first connection line 70 connects one end 78 of the first circular arc 66 to one end 80 of the second circular arc 68. The second connection line 72 is a straight line. The second connection line 72 connects the other end 74 of the first circular arc 66 to the other end 76 of the second circular arc 68. Preferably, the length L of a longest line segment that can be drawn within the contour of each dimple 62 is larger than the sum of the curvature radius R1 of the first circular arc 66 and the curvature radius R2 of the second circular arc 68.

7 Claims, 8 Drawing Sheets

(51) Int. Cl.
 *B60C 17/00* (2006.01)
 *B60C 15/024* (2006.01)

(56) References Cited

FOREIGN PATENT DOCUMENTS

| JP | 2009-298397 A | 12/2009 |
| JP | 2010-260376 | * 11/2010 |
| JP | 2010-274886 A | 12/2010 |
| JP | 2010-280322 A | 12/2010 |

OTHER PUBLICATIONS

International Searching Authority for PCT/JP2012/075398 mailed on Dec. 25, 2012.

* cited by examiner

PNEUMATIC TIRE

TECHNICAL FIELD

The present invention relates to pneumatic tires. Specifically, the present invention relates to pneumatic tires having dimples on side surfaces thereof.

BACKGROUND ART

In recent years, run flat tires including load support layers inside sidewalls have been developed and widespread. Highly hard crosslinked rubber is used for the support layers. Such run flat tires are called a side reinforcing type. In this type of a run flat tire, if the internal pressure is reduced due to puncture, a load is supported by the support layers. The support layers suppress flexure of the tire in a punctured state. Even if running is continued in the punctured state, the highly hard crosslinked rubber suppresses heat generation in the support layers. This run flat tire allows for running for some distance even in the punctured state. An automobile having such run flat tires mounted thereon need not be always equipped with a spare tire. The use of this run flat tire avoids change of a tire in an inconvenient place.

When running with the run flat tire in a punctured state is continued, deformation and restoration of the support layers are repeated. Due to the repetition, heat is generated in the support layers, and the temperature of the tire reaches a high temperature. The heat causes breakage of rubber components of the tire and separation among the rubber components of the tire. It is impossible to run with the tire in which the breakage and the separation have occurred. Run flat tires are desired which allow for running for a long period of time in a punctured state, in other words, run flat tires are desired in which breakage and separation due to heat are less likely to occur.

JP2009-298397 discloses a run flat tire having dimples on sidewalls thereof. The surface shape of each dimple is a circle. The surface area of each sidewall is large. In the tire, the dimples generate turbulent flow. The large surface area and the turbulent flow promote release of heat from each sidewall to the atmosphere. In the tire, the temperature is less likely to rise.

JP2010-274886 discloses a run flat tire having dimples whose surface shapes are elongated circles. In the tire as well, release of heat from each sidewall to the atmosphere is promoted by the dimples. The elongated circles have directionality. In the tire, heat release is further promoted by making the longitudinal direction of each dimple appropriate. In the tire, the temperature is less likely to rise. The tire is excellent in durability during running in a punctured state.

CITATION LIST

Patent Literature

Patent Literature 1: JP2009-298397
Patent Literature 2: JP2010-274886

SUMMARY OF THE INVENTION

Problems to be Solved by the Invention

The circumferential distance of an outward portion, in the radial direction, of the sidewall is larger than that of an inward portion, in the radial direction, of the side wall. The circumferential distance varies depending on the portion of the side wall. With the elongated circle-shaped dimples disclosed in JP2010-274886, it is impossible to compensate for this variation. The width of a land between a dimple and a dimple adjacent to this dimple varies depending on the portion in the radial direction. In the tire, the efficiency of generation of turbulent flow is not good. There is room for improvement in the durability of the tire.

For tires other than run flat tires as well, there is a demand of improving durability by dimples.

An object of the present invention is to provide a pneumatic tire which is excellent in durability.

Solution to the Problems

A pneumatic tire according to the present invention includes a large number of dimples on side surfaces thereof. A contour of each dimple has:

(1) a first circular arc having one end and another end;
(2) a second circular arc having a curvature radius larger than a curvature radius of the first circular arc and having one end and another end;
(3) a first connection line connecting the one end of the first circular arc to the one end of the second circular arc; and
(4) a second connection line connecting the other end of the first circular arc to the other end of the second circular arc.

Preferably, a ratio of the curvature radius of the second circular arc to the curvature radius of the first circular arc is equal to or greater than 105% but equal to or less than 200%.

Preferably, a length of a longest line segment that can be drawn within the contour of each dimple is larger than a sum of the curvature radius of the first circular arc and the curvature radius of the second circular arc.

Preferably, the dimples are arranged along a circumferential direction. Preferably, dimples in each of which a second circular arc is located outward of a first circular arc in a radial direction and dimples in each of which a second circular arc is located inward of a first circular arc in the radial direction are alternately arranged.

Each of the first connection line and the second connection line may be a straight line.

Each of the first connection line and the second connection line may be a circular arc. Preferably, a curvature radius of the second connection line is larger than a curvature radius of the first connection line. Preferably, an angle of a straight line passing through a center of the first circular arc and a center of the first connection line, relative to a straight line passing through a center of the second circular arc and the center of the first connection line, is equal to or greater than 15° but equal to or less than 120°.

Advantageous Effects of the Invention

In the pneumatic tire according to the present invention, a large surface area of each side surface is achieved by the dimples. The large surface area promotes release of heat from the tire to the atmosphere. The dimples further generate turbulent flow around the tire. Since each dimple has the first circular arc and the second circular arc having curvature radii different from each other, turbulent flow is efficiently generated. The turbulent flow promotes release of heat from the tire to the atmosphere. The tire is excellent in durability.

DESCRIPTION OF EMBODIMENTS

The following will describe in detail the present invention based on preferred embodiments with appropriate reference to the drawings.

Figure 1:
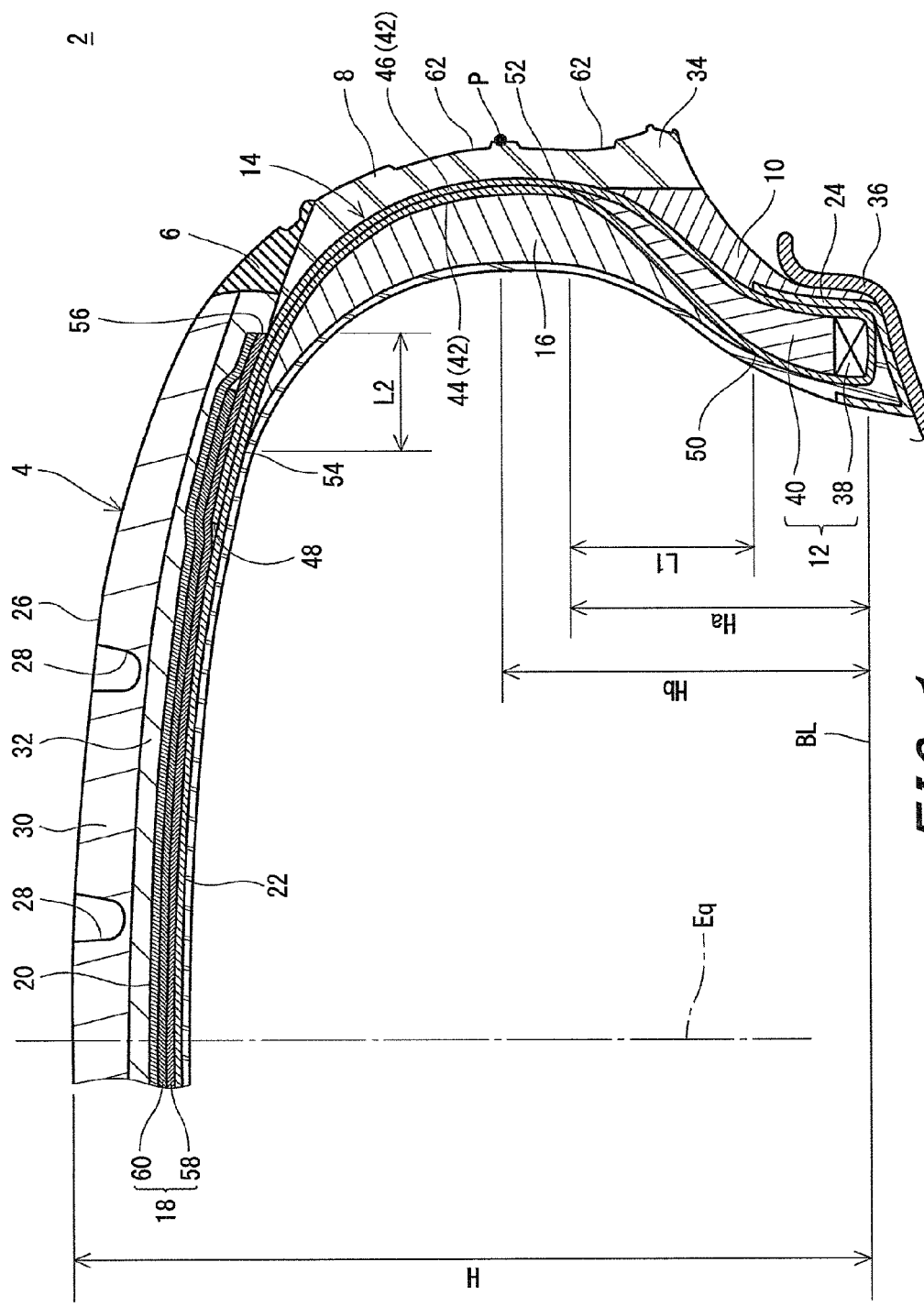
FIG. 1 is a cross-sectional view showing a portion of a pneumatic tire according to one embodiment of the present invention.

FIG. 1 shows a run flat tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line Eq represents the equator plane of the tire 2. In FIG. 1, an arrow H represents the height of the tire 2 from a base line BL (described in detail later).

The tire 2 includes a tread 4, wings 6, sidewalls 8, clinch portions 10, beads 12, a carcass 14, load support layers 16, a belt 18, a band 20, an inner liner 22, and chafers 24. The belt 18 and the band 20 form a reinforcing layer. The reinforcing layer may be composed of the belt 18 only. The reinforcing layer may be composed of the band 20 only.

The tread 4 has a shape projecting outward in the radial direction. The tread 4 forms a tread surface 26 which is brought into contact with a road surface. Grooves 28 are formed on the tread surface 26. A tread pattern is formed by the grooves 28. The tread 4 includes a cap layer 30 and a base layer 32. The cap layer 30 is formed from a crosslinked rubber. The base layer 32 is formed from another crosslinked rubber. The cap layer 30 is located outward of the base layer 32 in the radial direction. The cap layer 30 is laminated on the base layer 32.

The sidewalls 8 extend from the ends of the tread 4 substantially inward in the radial direction. The sidewalls 8 are formed from a crosslinked rubber. The sidewalls 8 prevent injury of the carcass 14. The sidewalls 8 include ribs 34. The ribs 34 project outward in the axial direction. During running in a punctured state, the ribs 34 abut against flanges 36 of a rim. The abutment allows deformation of the beads 12 to be suppressed. The tire 2 in which the deformation is suppressed is excellent in durability in a punctured state.

The clinch portions 10 are located substantially inward of the sidewalls 8 in the radial direction. The clinch portions 10 are located outward of the beads 12 and the carcass 14 in the axial direction. The clinch portions 10 abut against the flanges 36 of the rim.

The beads 12 are located inward of the sidewalls 8 in the radial direction. Each bead 12 includes a core 38 and an apex 40 extending from the core 38 outward in the radial direction. The core 38 has a ring shape and includes a non-stretchable wound wire (typically, a steel wire). The apex 40 is tapered outward in the radial direction. The apex 40 is formed from a highly hard crosslinked rubber.

In FIG. 1, an arrow Ha indicates the height of the apex 40 from the base line BL. In other words, the height Ha is the distance from the base line to an outer end, in the radial direction, of the bead. The base line BL passes through an innermost point, in the radial direction, on the core 38. The base line BL extends in the axial direction. The ratio (Ha/H) of the height Ha of the apex 40 to the height H of the tire 2 is preferably equal to or greater than 0.1 and preferably equal to or less than 0.7. The apex 40 having a ratio (Ha/H) of 0.1 or greater can support the weight of the vehicle in a punctured state. The apex 40 contributes to durability of the tire 2 in a punctured state. In this respect, the ratio (Ha/H) is more preferably equal to or greater than 0.2. The tire 2 having a ratio (Ha/H) of 0.7 or less is excellent in ride comfort. In this respect, the ratio (Ha/H) is more preferably equal to or less than 0.6.

In FIG. 1, an arrow Hb indicates the height at a position P, at which the tire has maximum width W, from the base line BL. The ratio of the height Ha to the height Hb is preferably equal to or greater than 80%. The stiffness of each side portion of the tire 2 in which the ratio is equal to or greater than 80% is high. In the tire 2, deformation of each side portion relative to the rim flange as a fulcrum at the time of puncture is suppressed. The tire 2 is excellent in durability in a punctured state. In this respect, the ratio is more preferably equal to or greater than 85% and particularly preferably equal to or greater than 90%. In light of ride comfort in a normal state (a state where the tire 2 is inflated to a normal internal pressure), the ratio is preferably equal to or less than 110%.

The carcass 14 is formed of a carcass ply 42. The carcass ply 42 extends on and between the beads 12 on both sides, and extends along the tread 4 and the sidewalls 8. The carcass ply 42 is turned up around each core 38 from the inner side to the outer side in the axial direction. Due to this turning-up, a main portion 44 and turned-up portions 46 are formed in the carcass ply 42. Ends 48 of the turned-up portions 46 are located immediately below the belt 18. In other words, each turned-up portion 46 overlaps the belt 18. The carcass 14 has a so-called "ultra-highly turned-up structure". The carcass 14 having the ultra-highly turned-up structure contributes to durability of the tire 2 in a punctured state. The carcass 14 contributes to durability in a punctured state.

The carcass ply 42 includes a large number of cords aligned with each other, and a topping rubber. The absolute value of the angle of each cord relative to the equator plane is 45° to 90° and further 75° to 90°. In other words, the carcass 14 has a radial structure. The cords are formed from an organic fiber. Examples of preferable organic fibers include polyester fibers, nylon fibers, rayon fibers, polyethylene naphthalate fibers, and aramid fibers.

The load support layers 16 are located inward of the sidewalls 8 in the axial direction. Each support layer 16 is interposed between the carcass 14 and the inner liner 22. The support layers 16 are tapered inward and outward in the radial direction. Each support layer 16 has a crescent-like shape. The support layers 16 are formed from a highly hard crosslinked rubber. When the tire 2 is punctured, the support layers 16 support a load. The support layers 16 allow for driving for some distance with the tire 2 even in a punctured state. The run flat tire 2 is of a side reinforcing type. The tire 2 may include support layers each having a shape different from the shape of the support layer 16 shown in FIG. 1.

Portions of the carcass 14 which overlap the support layers 16 are separated from the inner liner 22. In other words, the carcass 14 is bent due to the presence of the support layers 16. In a punctured state, a compressive load is applied to the support layers 16, and a tensile load is applied to regions of the carcass 14 which are near the support layers 16. Each support layer 16 is a lump of rubber and can sufficiently bear the compressive load. The cords of the carcass 14 can sufficiently bear the tensile load. The support layers 16 and the carcass cords suppress vertical flexure of the tire 2 in the punctured state. The tire 2 of which vertical flexure is suppressed is excellent in handling stability in a punctured state.

In light of suppression of vertical distortion in a punctured state, the hardness of each support layer 16 is preferably equal to or greater than 60 and more preferably equal to or greater than 65. In light of ride comfort in a normal state, the hardness is preferably equal to or less than 90 and more preferably equal to or less than 80. The hardness is measured according to the standard of "JIS K6253" with a type A durometer. The hardness is measured by pressing the durometer against the cross section shown in FIG. 1. The measurement is performed at a temperature of 23° C.

Lower ends 50 of the support layers 16 are located inward of upper ends 52 of the apexes 40 (i.e., outer ends, in the radial direction, of the beads) in the radial direction. In other words, the support layers 16 overlap the apexes 40. In FIG. 1, an arrow L1 indicates the distance in the radial direction between the lower end 50 of each support layer 16 and the upper end 52 of the corresponding apex 40. The distance L1 is preferably equal to or greater than 5 mm and preferably equal to or less than 50 mm. In the tire 2 in which the distance L1 is within this range, a uniform stiffness distribution is obtained. The distance L1 is more preferably equal to or greater than 10 mm. The distance L1 is more preferably equal to or less than 40 mm.

Upper ends 54 of the support layers 16 are located inward of ends 56 of the belt 18 in the axial direction. In other words, the support layers 16 overlap the belt 18. In FIG. 1, an arrow L2 indicates the distance in the axial direction between the upper end 54 of each support layer 16 and the corresponding end 56 of the belt 18. The distance L2 is preferably equal to or greater than 2 mm and preferably equal to or less than 50 mm. In the tire 2 in which the distance L2 is within this range, a uniform stiffness distribution is obtained. The distance L2 is more preferably equal to or greater than 5 mm. The distance L2 is more preferably equal to or less than 40 mm.

In light of suppression of vertical distortion in a punctured state, the maximum thickness of each support layer 16 is preferably equal to or greater than 3 mm, more preferably equal to or greater than 4 mm, and particularly preferably equal to or greater than 7 mm. In light of reduction in the weight of the tire 2, the maximum thickness is preferably equal to or less than 25 mm and more preferably equal to or less than 20 mm.

The belt 18 is located outward of the carcass 14 in the radial direction. The belt 18 is laminated on the carcass 14. The belt 18 reinforces the carcass 14. The belt 18 includes an inner layer 58 and an outer layer 60. As is obvious from FIG. 1, the width of the inner layer 58 is slightly greater than the width of the outer layer 60. Each of the inner layer 58 and the outer layer 60 includes a large number of cords aligned with each other, and a topping rubber, which are not shown. Each cord is tilted relative to the equator plane. Normally, the absolute value of the tilt angle is equal to or greater than 10° but equal to or less than 35°. The direction in which each cord of the inner layer 58 is tilted relative to the equator plane is opposite to the direction in which each cord of the outer layer 60 is tilted relative to the equator plane. The material of the cords is preferably steel. An organic fiber may be used for the cords. The width, in the axial direction, of the belt 18 is preferably equal to or greater than 0.85 times of the maximum width W (described in detail later) of the tire 2 and preferably equal to or less than 1.0 time of the maximum width W of the tire 2. The belt 18 may include three or more layers.

The band 20 covers the belt 18. The band 20 includes a cord and a topping rubber, which are not shown. The cord is helically wound. The band 20 has a so-called jointless structure. The cord extends substantially in the circumferential direction. The angle of the cord relative to the circumferential direction is equal to or less than 5° and further equal to or less than 2°. The belt 18 is secured by the cord, so that lifting of the belt 18 is suppressed. The cord is formed from an organic fiber. Examples of preferable organic fibers include nylon fibers, polyester fibers, rayon fibers, polyethylene naphthalate fibers, and aramid fibers.

The tire 2 may include, instead of the band 20, edge bands which cover only the vicinities of the ends 56 of the belt 18. The tire 2 may include both the band 20 and the edge bands.

The inner liner 22 is bonded to the inner peripheral surface of the carcass 14. The inner liner 22 is formed from a crosslinked rubber. A rubber that has an excellent air blocking property is used for the inner liner 22. The inner liner 22 maintains the internal pressure of the tire 2.

Figure 2:
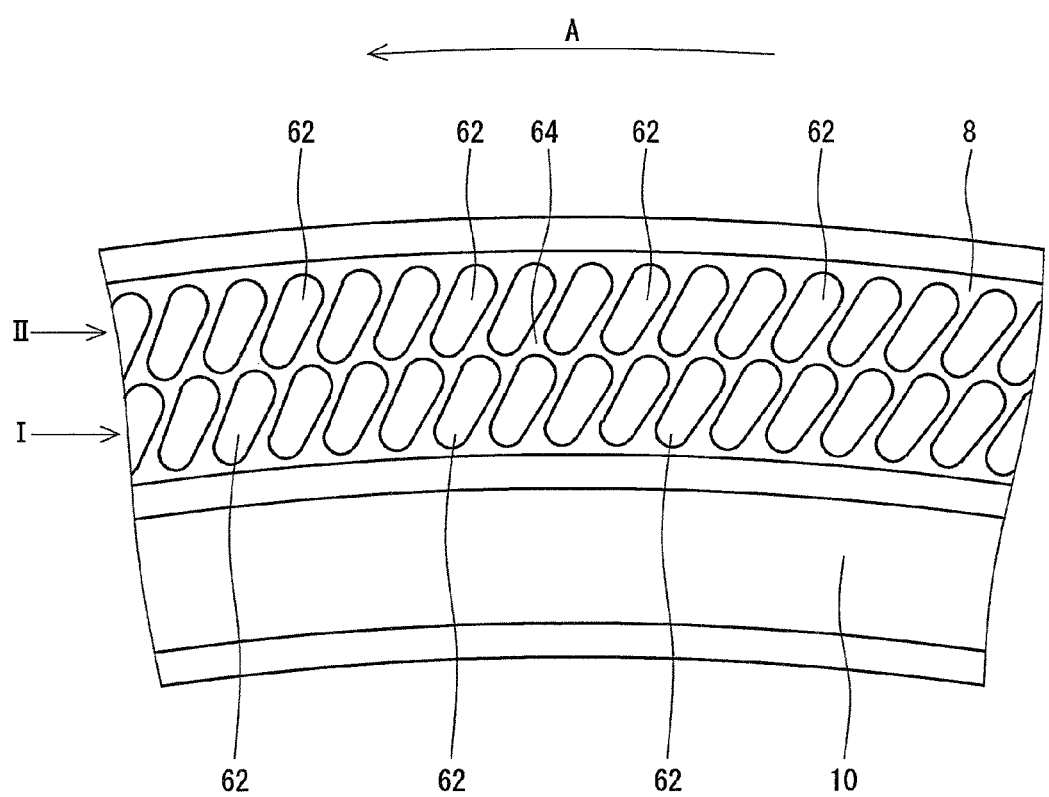
FIG. 2 is a front view showing a side surface of the tire in FIG. 1.

In FIG. 2, the up-down direction is the radial direction, and the direction indicated by an arrow A is the circumferential direction. As shown in FIGS. 1 and 2, the tire 2 has a large number of dimples 62 on the side surfaces thereof. In the present invention, the side surfaces mean regions of the outer surfaces of the tire 2 that can be viewed in the axial direction. Typically, the dimples 62 are formed on the surfaces of the sidewalls 8. Of each sidewall 8, a part other than the dimples 62 is a land 64.

As is obvious from FIG. 2, the dimples 62 can be divided into dimples 62 of a first row I and dimples 62 of a second row II. The dimples 62 of the second row II are located outward of the dimples 62 of the first row I in the radial direction. The dimples 62 of the first row I are aligned along the circumferential direction. The dimples 62 of the second row II are also aligned along the circumferential direction.

Figure 3:
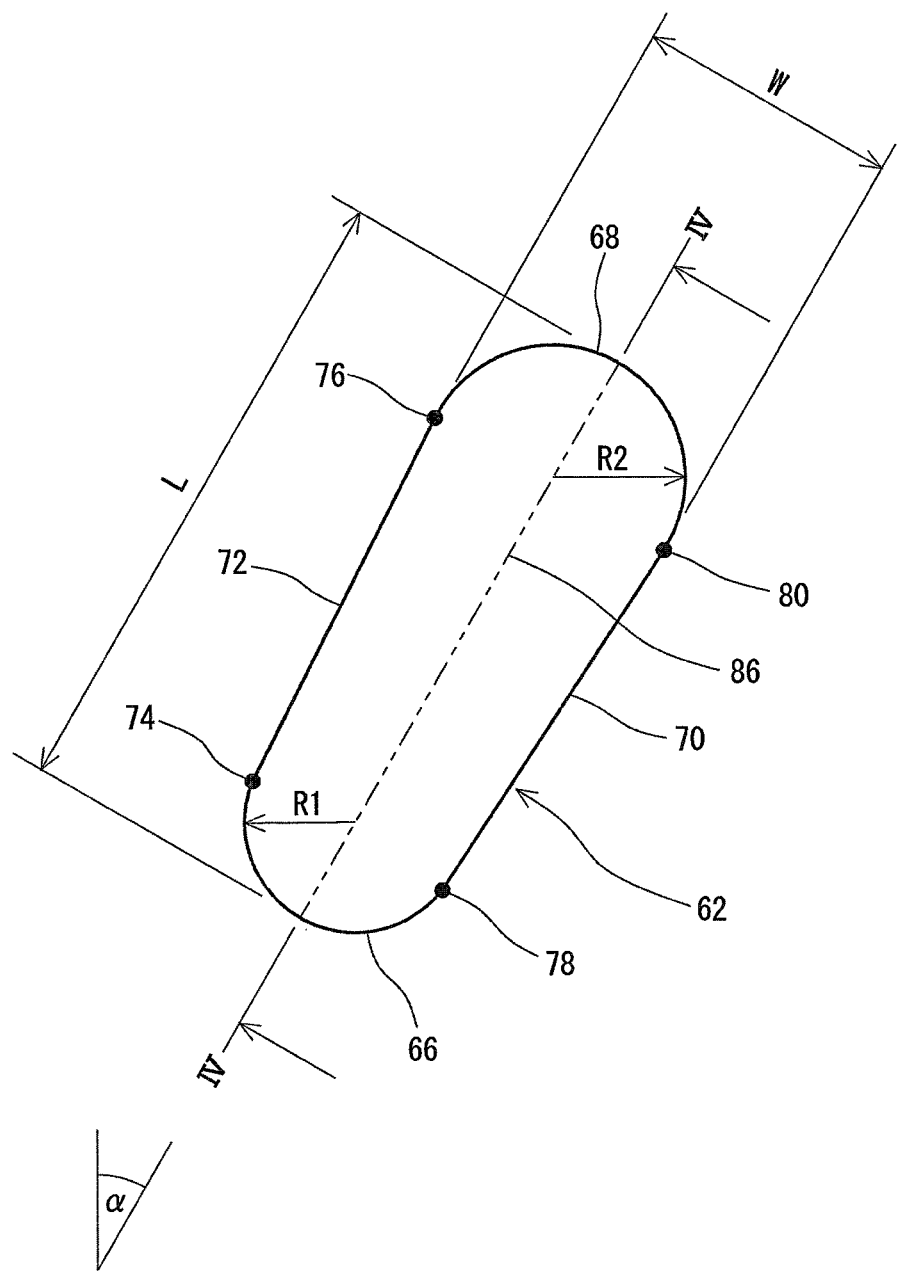
FIG. 3 is an enlarged view showing a dimple present on the side surface in FIG. 2.

FIG. 3 is an enlarged view showing the dimple 62. The contour of the dimple 62 is composed of a first circular arc 66, a second circular arc 68, a first connection line 70, and a second connection line 72. The curvature radius R2 of the second circular arc 68 is larger than the curvature radius R1 of the first circular arc 66. The first connection line 70 is a straight line. The first connection line 70 connects one end 78 of the first circular arc 66 to one end 80 of the second circular arc 68. The second connection line 72 is a straight line. The second connection line 72 connects the other end 74 of the first circular arc 66 to the other end 76 of the second circular arc 68. In the present embodiment, the first connection line 70 is in contact with the first circular arc 66 and is also in contact with the second circular arc 68. The second connection line 72 is in contact with the first circular arc 66 and is also in contact with the second circular arc 68.

Figure 4:
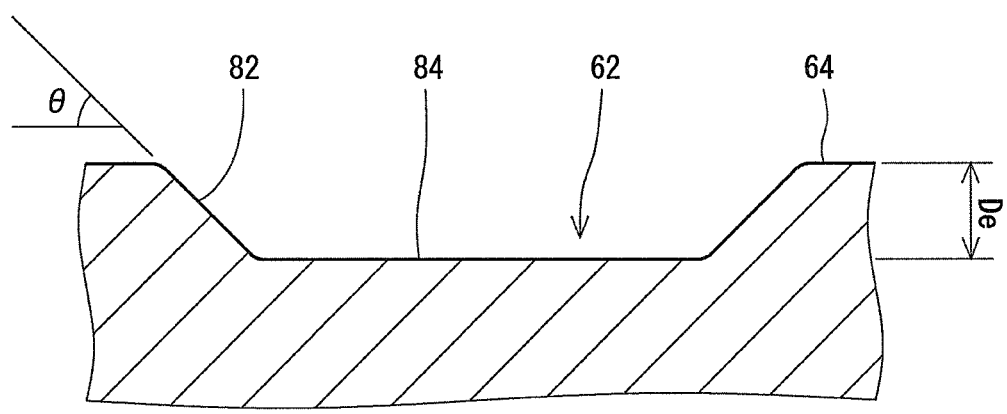
FIG. 4 is a cross-sectional view taken along a line IV-IV in FIG. 3.

FIG. 4 is a cross-sectional view taken along a line IV-IV in FIG. 3. As is obvious from FIG. 4, the dimple 62 is recessed from the land 64. The dimple 62 has a slope surface 82 and a bottom surface 84. The slope surface 82 is connected to the land 64. The bottom surface 84 is connected to the slope surface 82.

The surface area of each sidewall 8 having the dimples 62 is larger than the surface area of the sidewall 8 when it is postulated that no dimples 62 exist thereon. The area of contact between the tire 2 and the atmosphere is large. The large area of contact promotes release of heat from the tire 2 to the atmosphere.

The tire 2 rotates during running. A vehicle on which the tire 2 is mounted travels. By the rotation of the tire 2 and the travelling of the vehicle, air flows across the dimples 62. The air flows along the land 64 and flows into the dimple 62 along the slope surface 82. The air flows along the bottom surface 84, flows along the slope surface 82 at the downstream side, and flows out from the dimple 62. The air further flows along the land 64 at the downstream side.

When air flows across the dimple 62, eddies are generated in the flow of the air. In other words, turbulent flow is generated at the dimple 62. When running with the tire 2 is continued in a punctured state, deformation and restoration of the support layers 16 are repeated. Due to the repetition, heat is generated in the support layers 16. The turbulent flow promotes release of the heat to the atmosphere. In the tire 2, breakage of rubber components and separation among the rubber components which are caused due to heat are suppressed. The tire 2 allows for running for a long period of time in a punctured state. The turbulent flow contributes to heat release not only in a punctured state but also in a normal state. The dimples 62 also contribute to durability of the tire 2 in a normal state. Running in a state where the internal pressure is less than a normal value may be inadvertently caused by a driver. The dimples 62 can also contribute to durability in this case.

In the tire 2, temperature rise is suppressed by the dimples 62. Thus, even when the support layers 16 are thin, running in a punctured state for a long period of time is possible. The thin support layers 16 achieve reduction in the weight of the tire 2. The thin support layers 16 reduce rolling resistance. The tire 2 which is lightweight and has reduced rolling resistance contributes to reduction in the fuel consumption of a vehicle. Furthermore, the thin support layers 16 also achieve excellent ride comfort.

Since the curvature radius R2 of the second circular arc 68 is larger than the curvature radius R1 of the first circular arc 66, the first connection line 70 and the second connection line 72 are not parallel to each other. The distance between the first connection line 70 and the second connection line 72 gradually increases along a direction from the first circular arc 66 to the second circular arc 68. As is obvious when referring to FIGS. 2 and 3 together, the second circular arc 68 is located outward of the first circular arc 66 in the radial direction. Therefore, the distance between the first connection line 70 and the second connection line 72 gradually increases from the inner side to the outer side in the radial direction. The circumferential distance of an outward portion, in the radial direction, of the sidewall 8 is larger than that of an inward portion, in the radial direction, of the side wall 8. If the first connection line 70 and the second connection line 72 are parallel to each other, a width of the land 64 at the outward portion, in the radial direction, of the sidewall 8 is larger than a width of the land 64 at the inward portion, in the radial direction, of the side wall 8. In the tire according to the present invention, since the first connection line 70 and the second connection line 72 are not parallel to each other, the width of the land 64 at the outward portion, in the radial direction, of the sidewall 8 is not excessively large.

The ratio of the curvature radius R2 of the second circular arc 68 to the curvature radius R1 of the first circular arc 66 is preferably equal to or greater than 105% and preferably equal to or less than 200%, and is particularly preferably equal to or greater than 110% and particularly preferably equal to or less than 150%. The curvature radius R1 is preferably equal to or greater than 1 mm and preferably equal to or less than 100 mm, and is particularly preferably equal to or greater than 3 mm and particularly preferably equal to or less than 10 mm. The curvature radius R2 is preferably equal to or greater than 1 mm and preferably equal to or less than 100 mm, and is particularly preferably equal to or greater than 6 mm and particularly preferably equal to or less than 20 mm.

In FIG. 3, an alternate long and two short dashes line indicates a longest line segment 86 that can be drawn within the contour of the dimple 62. The direction of the line segment 86 is the longitudinal direction of the dimple 62. In FIG. 3, a reference sign $\alpha$ indicates the angle of the longitudinal direction relative to the radial direction. The angle $\alpha$ is preferably equal to or greater than 0° and preferably equal to or less than 60°, and is particularly preferably equal to or greater than 15° and particularly preferably equal to or less than 45°. When the angle is set within the above range, turbulent flow is efficiently generated.

The length L of the longest line segment 86 is larger than the sum of the curvature radius R1 of the first circular arc 66 and the curvature radius R2 of the second circular arc 68. Thus, turbulent flow is efficiently generated.

From the standpoint that turbulent flow is easily generated, the length L is preferably equal to or greater than 1 mm and particularly preferably equal to or greater than 10 mm. From the standpoint that turbulent flow is generated at a large number of locations, the length L is preferably equal to or less than 100 mm, more preferably equal to or less than 50 mm, and particularly preferably equal to or less than 30 mm.

In FIG. 3, a reference sign W indicates the width of the dimple 62. The width W is measured in the direction orthogonal to the line segment 86. From the standpoint that turbulent flow is easily generated, the width W is preferably equal to or greater than 2 mm and particularly preferably equal to or greater than 4 mm. From the standpoint that turbulent flow is generated at a large number of locations, the width W is preferably equal to or less than 100 mm and particularly preferably equal to or less than 20 mm.

In FIG. 4, an arrow De indicates the depth of the dimple 62. The depth De is preferably equal to or greater than 0.1 mm and preferably equal to or less than 7 mm. At the dimple 62 having a depth De of 0.1 mm or greater, sufficient turbulent flow is generated. In this respect, the depth De is more preferably equal to or greater than 0.3 mm and particularly preferably equal to or greater than 0.5 mm. In the dimple 62 having a depth De of 7 mm or less, air is less likely to stay at its bottom. In this respect, the depth De is more preferably equal to or less than 4 mm and particularly preferably equal to or less than 3.0 mm.

The volume of the dimple 62 is preferably equal to or greater than 1.0 $mm^3$ and preferably equal to or less than 400 $mm^3$. At the dimple 62 having a volume of 1.0 $mm^3$ or greater, sufficient turbulent flow is generated. In this respect, the volume is more preferably equal to or greater than 1.5 $mm^3$ and particularly preferably equal to or greater than 2.0 $mm^3$. In the dimple 62 having a volume of 400 $mm^3$ or less, air is less likely to stay at the bottom surface 84. In this respect, the volume is more preferably equal to or less than 300 $mm^3$ and particularly preferably equal to or less than 250 $mm^3$.

The sum of the volumes of all the dimples 62 is preferably equal to or greater than 300 mm³ and preferably equal to or less than 5000000 mm³. In the tire 2 in which the sum is equal to or greater than 300 mm³, heat is sufficiently released. In this respect, the sum is more preferably equal to or greater than 600 mm³ and particularly preferably equal to or greater than 800 mm³. In the tire 2 in which the sum is equal to or less than 5000000 mm³, each sidewall 8 has sufficient wear resistance. In this respect, the sum is more preferably equal to or less than 1000000 mm³ and particularly preferably equal to or less than 500000 mm³.

The area of the dimple 62 is preferably equal to or greater than 3 mm² and preferably equal to or less than 4000 mm². At the dimple 62 having an area of 3 mm² or greater, sufficient turbulent flow is generated. In this respect, the area is more preferably equal to or greater than 12 mm² and particularly preferably equal to or greater than 20 mm². In the tire 2 in which the area of each dimple 62 is equal to or less than 4000 mm², each sidewall 8 has sufficient wear resistance. In this respect, the area is more preferably equal to or less than 2000 mm² and particularly preferably equal to or less than 1300 mm². In the present invention, the area of the dimple 62 means the area of a figure surrounded by the contour of the dimple 62.

The total number of the dimples 62 is preferably equal to or greater than 50 and preferably equal to or less than 5000. In the tire 2 in which the total number is equal to or greater than 50, turbulent flow can be generated at a large number of locations. In this respect, the total number is more preferably equal to or greater than 100 and particularly preferably equal to or greater than 150. In the tire 2 in which the total number is equal to or less than 5000, each dimple 62 can have a sufficient size. In this respect, the total number is more preferably equal to or less than 2000 and particularly preferably equal to or less than 1000. The total number and pattern of the dimples 62 can be determined as appropriate in accordance with the size of the tire 2 and the area of each side portion.

The tire 2 may have, together with the dimple 62 shown in FIG. 3, dimples each having a shape different from the shape of the dimple 62.

Each dimple 62 is clearly distinguishable from a groove seen in an existing tire. A groove has a high ratio of its length to its width. In a tire having a groove, air is likely to stay. Meanwhile, each dimple 62 has a low ratio of its length L to its width W. Therefore, in the tire 2 having the dimples 62, air is less likely to stay. The ratio (L/W) of the length L to the width W is preferably equal to or less than 5.0, more preferably equal to or less than 3.5, and particularly preferably equal to or less than 2.5.

As shown in FIG. 4, a cross-sectional shape of the dimple 62 is a trapezoid. In the dimple 62, the volume is large with respect to the depth De. Therefore, both a sufficient volume and a small depth De can be achieved. The tire 2 in which the depth De is small is lightweight.

In FIG. 4, a reference sign 8 indicates an angle of the slope surface 82. The angle θ is preferably equal to or greater than 10° and preferably equal to or less than 70°. In the dimple 62 having an angle θ of 10° or greater, both a sufficient volume and a small depth De can be achieved. In this respect, the angle θ is more preferably equal to or greater than 20° and particularly preferably equal to or greater than 25°. In the dimple 62 having an angle θ of 70° or less, air smoothly flows. In this respect, the angle θ is more preferably equal to or less than 60° and particularly preferably equal to or less than 55°.

In production of the tire 2, a plurality of rubber components are assembled to obtain a raw cover (unvulcanized tire). The raw cover is put into a mold. The outer surface of the raw cover abuts against the cavity surface of the mold. The inner surface of the raw cover abuts against a bladder or a core. The raw cover is pressurized and heated in the mold. The rubber composition in the raw cover flows due to the pressurization and the heating. Cross-linking reaction is caused in the rubber due to the heating, to obtain the tire 2. The dimples 62 are formed in the tire 2 by using a mold having pimples on a cavity surface thereof.

The dimensions and angles of each component of the tire 2 are measured in a state where the tire 2 is mounted on a normal rim and inflated to a normal internal pressure, unless otherwise specified. During the measurement, no load is applied to the tire 2. In the present specification, the normal rim means a rim specified in a standard on which the tire 2 is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire 2 is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire 2 for passenger car, the dimensions and angles are measured in a state where the internal pressure is 180 kPa.

Figure 5:
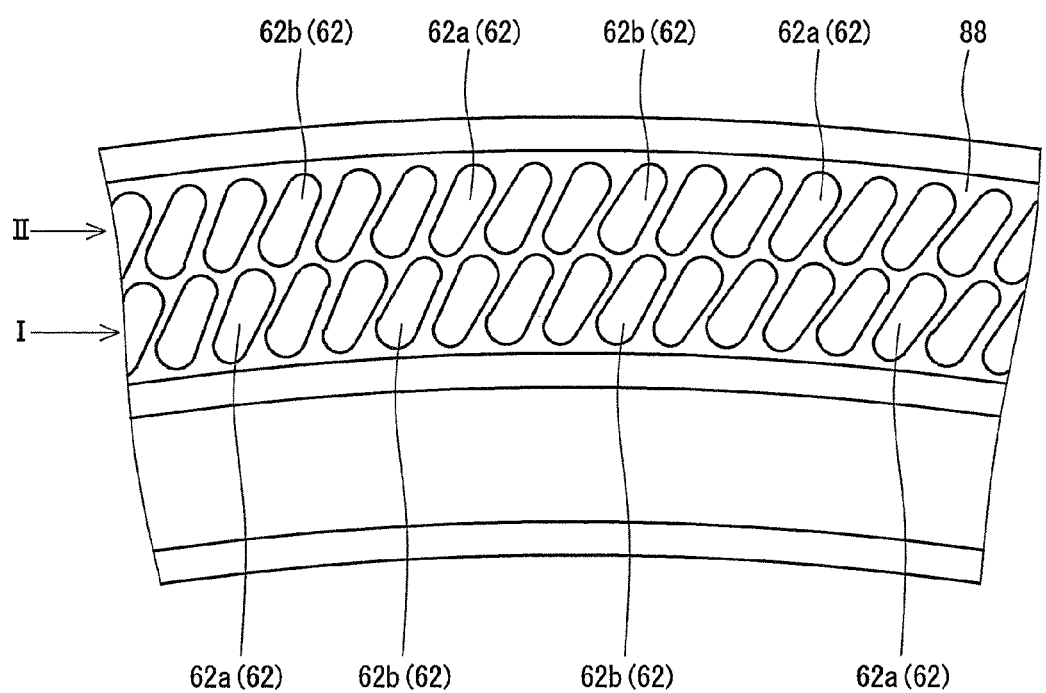
FIG. 5 is a front view showing a portion of a side surface of a pneumatic tire according to another embodiment of the present invention.

FIG. 5 is a front view showing a portion of a side surface of a pneumatic tire according to another embodiment of the present invention. The tire has a large number of dimples 62 on each sidewall 88 thereof. The shape of each dimple 62 is the same as the shape of each dimple of the tire shown in FIG. 2.

As is obvious from FIG. 5, the dimples 62 can be divided into dimples 62 of a first row I and dimples 62 of a second row II. The dimples 62 of the second row II are located outward of the dimples 62 of the first row I in the radial direction. The dimples 62 of the first row I are aligned along the circumferential direction. The dimples 62 of the second row II are also aligned along the circumferential direction. In the first row I, dimples 62a in each of which the second circular arc 68 is located outward of the first circular arc 66 (see FIG. 3) in the radial direction and dimples 62b in each of which the second circular arc 68 is located inward of the first circular arc 66 in the radial direction are alternately arranged. In the second row II, dimples 62a in each of which the second circular arc 68 is located outward of the first circular arc 66 in the radial direction and dimples 62b in each of which the second circular arc 68 is located inward of the first circular arc 66 in the radial direction are alternately arranged. Generation of turbulent flow can be promoted by the alternate arrangement.

Figure 6:
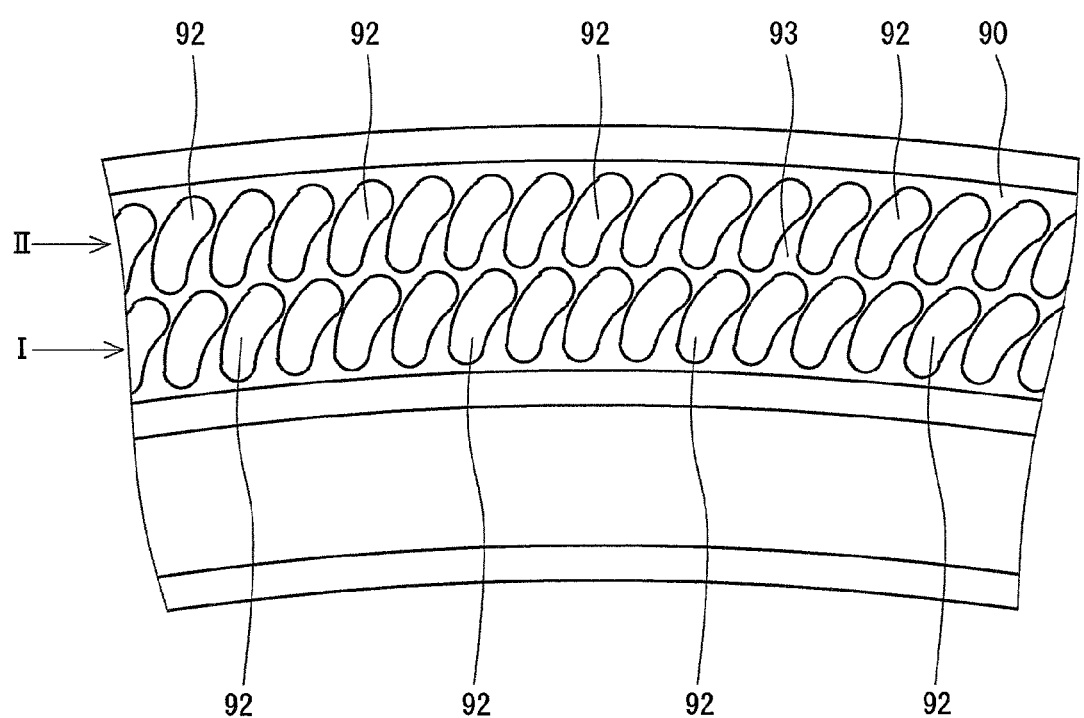
FIG. 6 is a front view showing a portion of a side surface of a pneumatic tire according to still another embodiment of the present invention.

FIG. 6 is a front view showing a portion of a side surface of a pneumatic tire according to still another embodiment of the present invention. The tire has a large number of dimples 92 on each sidewall 90 thereof. Of each sidewall 90, a part other than the dimples 92 is a land 93.

As is obvious from FIG. 6, the dimples 92 can be divided into dimples 92 of a first row I and dimples 92 of a second row II. The dimples 92 of the second row II are located outward of the dimples 92 of the first row I in the radial direction. The dimples 92 of the first row I are aligned along the circumferential direction. The dimples 92 of the second row II are also aligned along the circumferential direction.

Figure 7:
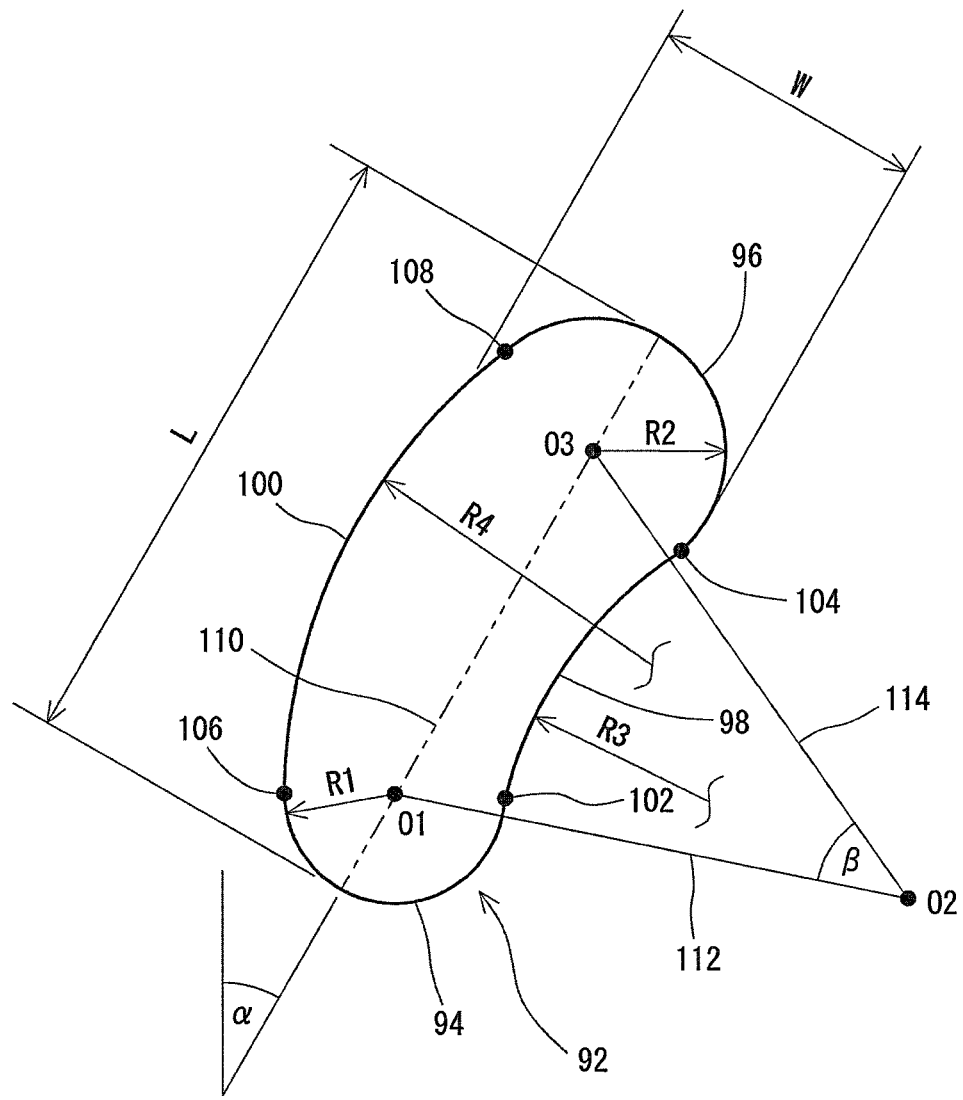
FIG. 7 is an enlarged view showing a dimple present on the side surface in FIG. 6.

FIG. 7 is an enlarged view showing the dimple 92. The contour of the dimple 92 is composed of a first circular arc 94, a second circular arc 96, a first connection line 98, and a second connection line 100. The curvature radius R2 of the second circular arc 96 is larger than the curvature radius R1 of the first circular arc 94. The first connection line 98 is a curved line. In this embodiment, the first connection line 98 is a circular arc. The first connection line 98 connects one end 102 of the first circular arc 94 to one end 104 of the second circular arc 96. The second connection line 100 is a curved line. In this embodiment, the second connection line 100 is a circular arc. The second connection line 100 connects the other end 106 of the first circular arc 94 to the other end 108 of the second circular arc 96. The curvature radius R4 of the second connection line 100 is larger than the curvature radius R3 of the first connection line 98. In the present embodiment, the first connection line 98 is in contact with the first circular arc 94 and is also in contact with the second circular arc 96. The second connection line 100 is in contact with the first circular arc 94 and is also in contact with the second circular arc 96.

Similarly to the dimple 62 shown in FIG. 4, each dimple 92 also has a slope surface and a bottom surface which are not shown. In the tire as well, release of heat from the tire to the atmosphere is promoted by the dimples 92.

The ratio of the curvature radius R2 of the second circular arc 96 to the curvature radius R1 of the first circular arc 94 is preferably equal to or greater than 105% and preferably equal to or less than 200%, and is particularly preferably equal to or greater than 110% and particularly preferably equal to or less than 150%. The curvature radius R1 is preferably equal to or greater than 1 mm and preferably equal to or less than 100 mm, and is particularly preferably equal to or greater than 3 mm and particularly preferably equal to or less than 10 mm. The curvature radius R2 is preferably equal to or greater than 1 mm and preferably equal to or less than 100 mm, and is particularly preferably equal to or greater than 6 mm and particularly preferably equal to or less than 20 mm.

The ratio of the curvature radius R4 of the second connection line 100 to the curvature radius R3 of the first connection line 98 is preferably equal to or greater than 105% and preferably equal to or less than 200%, and is particularly preferably equal to or greater than 110% and particularly preferably equal to or less than 150%. The curvature radius R3 is preferably equal to or greater than 5 mm and particularly preferably equal to or greater than 10 mm. The curvature radius R4 is preferably equal to or greater than 8 mm and particularly preferably equal to or greater than 16 mm.

Preferably, the curvature radius R3 of the first connection line is larger than the curvature radius R2 of the second circular arc. At the dimple 92, turbulent flow is efficiently generated.

In FIG. 7, an alternate long and two short dashes line indicates a longest line segment 110 that can be drawn within the contour of the dimple 92. In FIG. 7, a reference sign α indicates the angle of the line segment 110 relative to the radial direction. The angle α is preferably equal to or greater than 0° and preferably equal to or less than 60°, and is particularly preferably equal to or greater than 15° and particularly preferably equal to or less than 45°. When the angle is set within the above range, turbulent flow is efficiently generated.

The length L of the longest line segment 110 is larger than the sum of the curvature radius R1 of the first circular arc 94 and the curvature radius R2 of the second circular arc 96. Thus, turbulent flow is efficiently generated.

From the standpoint that turbulent flow is easily generated, the length L is preferably equal to or greater than 1 mm and particularly preferably equal to or greater than 10 mm. From the standpoint that turbulent flow is generated at a large number of locations, the length L is preferably equal to or less than 100 mm, more preferably equal to or less than 50 mm, and particularly preferably equal to or less than 30 mm.

In FIG. 7, a reference sign W indicates the width of the dimple 92. The width W is measured in the direction orthogonal to the line segment 110. From the standpoint that turbulent flow is easily generated, the width W is preferably equal to or greater than 2 mm and particularly preferably equal to or greater than 4 mm. From the standpoint that turbulent flow is generated at a large number of locations, the width W is preferably equal to or less than 100 mm and particularly preferably equal to or less than 20 mm.

The depth of the dimple 92 is preferably equal to or greater than 0.1 mm and preferably equal to or less than 7 mm. The depth is more preferably equal to or greater than 0.3 mm and particularly preferably equal to or greater than 0.5 mm. The depth is more preferably equal to or less than 4 mm and particularly preferably equal to or less than 3.0 mm.

The volume of the dimple 92 is preferably equal to or greater than 1.0 $mm^3$ and preferably equal to or less than 400 $mm^3$. The volume is more preferably equal to or greater than 1.5 $mm^3$ and particularly preferably equal to or greater than 2.0 $mm^3$. The volume is more preferably equal to or less than 300 $mm^3$ and particularly preferably equal to or less than 250 $mm^3$.

The sum of the volumes of all the dimples 92 is preferably equal to or greater than 300 $mm^3$ and preferably equal to or less than 5000000 $mm^3$. The sum is more preferably equal to or greater than 600 $mm^3$ and particularly preferably equal to or greater than 800 $mm^3$. The sum is more preferably equal to or less than 1000000 $mm^3$ and particularly preferably equal to or less than 500000 $mm^3$.

The area of the dimple 92 is preferably equal to or greater than 3 $mm^2$ and preferably equal to or less than 4000 $mm^2$. The area is more preferably equal to or greater than 12 $mm^2$ and particularly preferably equal to or greater than 20 $mm^2$. The area is more preferably equal to or less than 2000 $mm^2$ and particularly preferably equal to or less than 1300 $mm^2$.

The total number of the dimples 92 is preferably equal to or greater than 50 and preferably equal to or less than 5000. The total number is more preferably equal to or greater than 100 and particularly preferably equal to or greater than 150. The total number is more preferably equal to or less than 2000 and particularly preferably equal to or less than 1000. The total number and pattern of the dimples 92 can be determined as appropriate in accordance with the size of the tire and the area of each side portion.

In FIG. 7, a reference sign 112 indicates a straight line passing through the center O1 of the first circular arc 94 and the center O2 of the first connection line 98. A reference sign 114 indicates a straight line passing through the center O3 of the second circular arc 96 and the center O2 of the first connection line 98. A reference sign β indicates the angle between the straight line 112 and the straight line 114. From the standpoint that turbulent flow is efficiently generated, the angle β is preferably equal to or greater than 15° and preferably equal to or less than 120°, and is particularly preferably equal to or greater than 20° and particularly preferably equal to or less than 60°.

The tire may have, together with the dimple 92 shown in FIG. 7, dimples each having a shape different from the shape of the dimple 92.

Figure 8:
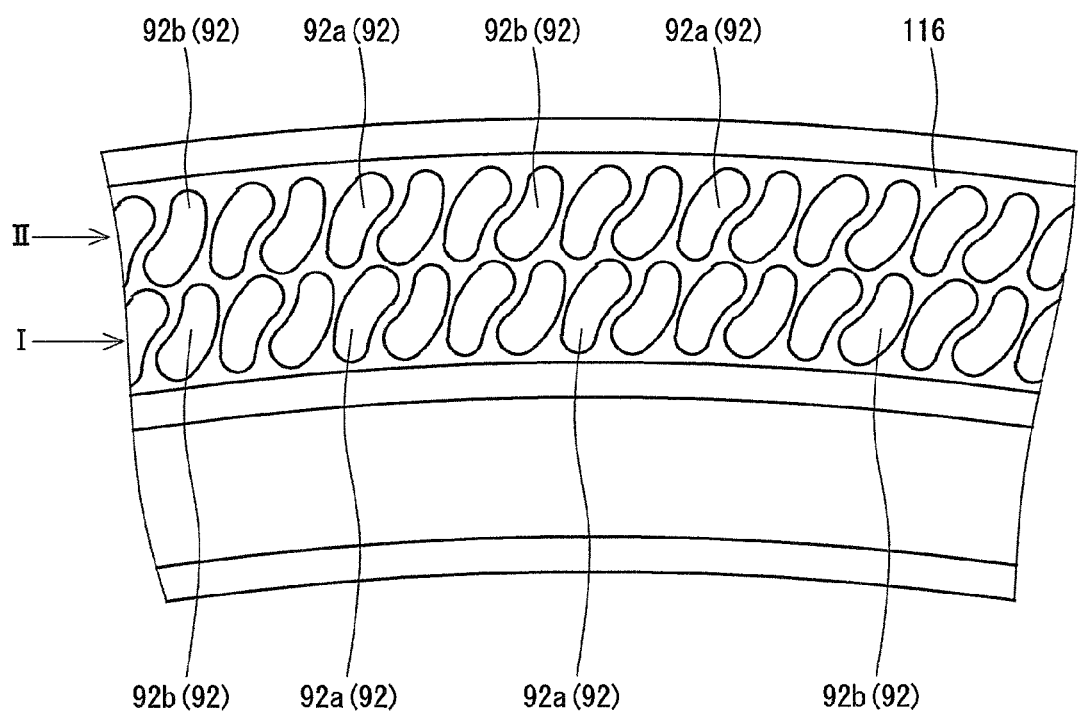
FIG. 8 is a front view showing a portion of a side surface of a pneumatic tire according to still another embodiment of the present invention.

FIG. 8 is a front view showing a portion of a side surface of a pneumatic tire according to still another embodiment of the present invention. The tire has a large number of dimples 92 on each sidewall 116 thereof. The shape of each dimple 92 is the same as the shape of the dimple of the tire shown in FIG. 7.

As is obvious from FIG. 8, the dimples 92 can be divided into dimples 92 of a first row I and dimples 92 of a second row II. The dimples 92 of the second row II are located outward of the dimples 92 of the first row I in the radial direction. The dimples 92 of the first row I are aligned along the circumferential direction. The dimples 92 of the second row II are also aligned along the circumferential direction. In the first row I, dimples 92a in each of which the second circular arc 96 is located outward of the first circular arc 94 in the radial direction and dimples 92b in each of which the second circular arc 96 is located inward of the first circular arc 94 in the radial direction are alternately arranged. In the second row II, dimples 92a in each of which the second circular arc 96 is located outward of the first circular arc 94 in the radial direction and dimples 92b in each of which the second circular arc 96 is located inward of the first circular arc 94 in the radial direction are alternately arranged. Generation of turbulent flow can be promoted by the alternate arrangement.

EXAMPLES

The following will show effects of the present invention by means of examples, but the present invention should not be construed in a limited manner based on the description of these examples.

Example 1

The run flat tire shown in FIGS. 1 to 4 was produced. The specifications of the tire are as follows.
Size: 245/40R18
Angle α: 30°
Curvature radius R1 of first circular arc: 6.0 mm
Curvature radius R2 of second circular arc: 8.0 mm
Distance L: 25 mm
Shapes of first connection line and second connection line: straight line Examples 2 and 3

Tires of Examples 2 and 3 were obtained in the same manner as Example 1, except the curvature radius R1 of the first circular arc and the curvature radius R2 of the second circular arc were as shown in tables below.

Example 4

A tire of Example 4 was obtained in the same manner as Example 1, except dimples in each of which a second circular arc is located outward of a first circular arc in the radial direction and dimples in each of which a second circular arc is located inward of a first circular arc in the radial direction were alternately arranged.

Example 5

A tire of Example 5 was obtained in the same manner as Example 1, except the first connection line was changed to a circular arc having a curvature radius R3 of 15 mm and the second connection line was changed to a circular arc having a curvature radius R4 of 20 mm.

Example 6

A tire of Example 6 was obtained in the same manner as Example 5, except dimples in each of which a second circular arc is located outward of a first circular arc in the radial direction and dimples in each of which a second circular arc is located inward of a first circular arc in the radial direction were alternately arranged.

Comparative Example 1

A tire of Comparative Example 1 was obtained in the same manner as Example 1, except circular dimples each having a diameter of 8.0 mm were arranged.

Comparative Example 2

A tire of Comparative Example 2 was obtained in the same manner as Example 1, except the curvature radius R1 of the first circular arc and the curvature radius R2 of the second circular arc were set at 7.0 mm. The surface shape of each dimple of the tire is an elongated circle.

[Durability]

Each tire was mounted on a rim having a size of "18×8.5 J" and was inflated such that the internal pressure thereof became 220 kPa. A valve core of the tire was removed to cause the inside of the tire to communicate with the atmosphere. The tire was run on a drum at a speed of 50 km/h. A running distance until abnormal noise was generated from the tire was measured. The results are shown as indexes in Tables 1 and 2 below. A higher value indicates a better result.

TABLE 1

Table 1
Results of Evaluation

|  | Example 1 | Example 2 | Example 3 | Example 4 |
|---|---|---|---|---|
| Surface shape | FIG. 3 | FIG. 3 | FIG. 3 | FIG. 3 |
| Arrangement | FIG. 2 | FIG. 2 | FIG. 2 | FIG. 5 |
| Angle α (deg.) | 30 | 30 | 30 | 30 |
| Curvature radius R1 (mm) | 6.0 | 9.0 | 12.0 | 6.0 |
| Curvature radius R2 (mm) | 8.0 | 12.0 | 16.0 | 8.0 |
| Distance L (mm) | 25 | 25 | 25 | 25 |
| First connection line | straight line | straight line | straight line | straight line |
| Curvature radius R3 (mm) | — | — | — | — |
| Second connection line | straight line | straight line | straight line | straight line |
| Curvature radius R4 (mm) | — | — | — | — |
| Angle β (deg.) | — | — | — | — |
| Depth De (mm) | 1.0 | 1.0 | 1.0 | 1.0 |
| Angle θ (deg.) | 45 | 45 | 45 | 45 |
| Running distance (index) | 120 | 125 | 110 | 125 |

TABLE 2

Table 2
Results of Evaluation

| | Example 5 | Example 6 | Comparative Example 1 | Comparative Example 2 |
|---|---|---|---|---|
| Surface shape | FIG. 7 | FIG. 7 | Circle | Elongated circle |
| Arrangement | FIG. 6 | FIG. 8 | — | FIG. 5 |
| Angle α (deg.) | 30 | 30 | — | 30 |
| Curvature radius R1 (mm) | 6.0 | 6.0 | — | 7.0 |
| Curvature radius R2 (mm) | 8.0 | 8.0 | — | 7.0 |
| Distance L (mm) | 25 | 25 | — | 25 |
| First connection line | circular arc | circular arc | — | straight line |
| Curvature radius R3 (mm) | 15 | 15 | — | — |
| Second connection line | circular arc | circular arc | — | straight line |
| Curvature radius R4 (mm) | 20 | 20 | — | — |
| Angle β (deg.) | 45 | 45 | — | — |
| Depth De (mm) | 1.0 | 1.0 | 1.0 | 1.0 |
| Angle θ (deg.) | 45 | 45 | 45 | 45 |
| Running distance (index) | 123 | 124 | 100 | 103 |

As shown in Tables 1 and 2, the tire of each Example is excellent in durability. From the results of evaluation, advantages of the present invention are clear.

INDUSTRIAL APPLICABILITY

The pneumatic tire according to the present invention can be mounted on various vehicles.

DESCRIPTION OF THE REFERENCE CHARACTERS

2 . . . tire
4 . . . tread
8, 88, 90, 116 . . . sidewall
10 . . . clinch portion
12 . . . bead
14 . . . carcass
16 . . . support layer
18 . . . belt
20 . . . band
62, 92 . . . dimple
64, 93 . . . land
66, 94 . . . first circular arc
68, 96 . . . second circular arc
70, 98 . . . first connection line
72, 100 . . . second connection line
82 . . . slope surface

The invention claimed is:

1. A pneumatic tire comprising a large number of dimples on side surfaces thereof, wherein a contour of each dimple has
a first circular arc having one end and another end,
a second circular arc having a curvature radius larger than a curvature radius of the first circular arc and having one end and another end,
a first connection line connecting the one end of the first circular arc to the one end of the second circular arc, and
a second connection line connecting the other end of the first circular arc to the other end of the second circular arc,
wherein
said one end of the second circular arc is located outward of said one end of the first circular arc in a radial direction, and
said other end of the second circular arc is located outward of said other end of the first circular arc in a radial direction.

2. The tire according to claim 1, wherein a ratio of the curvature radius of the second circular arc to the curvature radius of the first circular arc is equal to or greater than 105% but equal to or less than 200%.

3. The tire according to claim 1, wherein a length of a longest line segment that can be drawn within the contour of each dimple is larger than a sum of the curvature radius of the first circular arc and the curvature radius of the second circular arc.

4. A pneumatic tire comprising a large number of dimples on side surfaces thereof,
wherein a contour of each dimple has a first circular arc having one end and another end, a second circular arc having a curvature radius larger than a curvature radius of the first circular arc and having one end and another end, a first connection line connecting the one end of the first circular arc to the one end of the second circular arc, and a second connection line connecting the other end of the first circular arc to the other end of the second circular arc, and
wherein the dimples are arranged along a circumferential direction, and dimples in each of which a second circular arc is located outward of a first circular arc in a radial direction and dimples in each of which a second circular arc is located inward of a first circular arc in the radial direction are alternately arranged.

5. A pneumatic tire comprising a large number of dimples on side surfaces thereof,
wherein a contour of each dimple has a first circular arc having one end and another end, a second circular arc having a curvature radius larger than a curvature radius of the first circular arc and having one end and another end, a first connection line connecting the one end of the first circular arc to the one end of the second circular arc, and a second connection line connecting the other end of the first circular arc to the other end of the second circular arc, and
wherein each of the first connection line and the second connection line is a straight line.

6. A pneumatic tire comprising a large number of dimples on side surfaces thereof,
wherein a contour of each dimple has a first circular arc having one end and another end, a second circular arc having a curvature radius larger than a curvature radius of the first circular arc and having one end and another end, a first connection line connecting the one end of the first circular arc to the one end of the second circular arc, and a second connection line connecting the other end of the first circular arc to the other end of the second circular arc, and
wherein each of the first connection line and the second connection line is a circular arc, and a curvature radius of the second connection line is larger than a curvature radius of the first connection line.

7. The tire according to claim 6, wherein an angle of a straight line passing through a center of the first circular arc and a center of the first connection line, relative to a straight line passing through a center of the second circular arc and the center of the first connection line, is equal to or greater than 15° but equal to or less than 120°.

* * * * *